3,746,637
OXIDATIVE SWEETENING OF HYDROCARBONS WITH A CALCINED COGELLED PRECIPITATE OF IRON AND COPPER SALTS WITH SILICA SOL
Sun W. Chun, Murrysville, Harry A. Hamilton, Natrona Heights, and Angelo A. Montagna, Monroeville, Pa., assignors to Gulf Research & Development Company, Pittsburgh, Pa.
No Drawing. Filed July 15, 1971, Ser. No. 163,056
Int. Cl. C10g 27/04
U.S. Cl. 208—191
7 Claims

ABSTRACT OF THE DISCLOSURE

A process for the oxidative sweetening of sour hydrocarbons comprises contacting a sour hydrocarbon under sweetening conditions with a defined calcined cogelled catalyst comprising iron, silicon, oxygen and copper which is prepared by forming a solution of either a substantially alkali metal-free silica sol or an alkali-metal silicate sol, an iron group metal salt, such as ferric chloride, and a copper salt such as copper chloride, and cogelling the solution with, for example, ammonia, to form a precipitate which is then dried and calcined.

---

This invention relates to a method of preparing a catalyst comprising silicon, oxygen, an iron group metal and copper for use in a sweetening process.

BACKGROUND OF THE INVENTION

Distillates containing objectionable sulfur derivatives as thiols are known as "sour" distillates, and processes for oxidizing the thiols or sulfhydril (—SH) containing compounds to less objectionable disulfides are known as sweetening processes. The sweetening process is believed to be an oxidative coupling of two mercaptan molecules to give a disulfide, and thus the processes are normally run in the presence of a gas containing free molecular oxygen.

One of the most widely used catalysts for sweetening of sour petroleum fractions is copper chloride either in solution or on various supports. The use of sodium plumbite and caustic are also known. More recently, a patent to Norman L. Carr et al., U.S. Pat. 3,491,020, suggests the use of a catalyst composite comprising an inorganic amorphous polymer of iron, silicon and oxygen for the selective oxidation of mercaptans to disulfides. All of the above processes suffer, however, from low throughput life before the catalyst is required to be regenerated.

An improved catalyst has now been discovered for the sweetening of sour hydrocarbons. This improved catalyst is made, in accordance with the invention, by first forming a solution of either a substantially alkali metal-free silica sol or an alkali metal silicate sol, an iron group metal salt and a copper salt. The pH of this solution is increased by the addition of a suitable agent such as ammonia until a cogelled precipitate of the iron group metal, copper and silicon is formed. Thereafter the precipitate is dried and calcined. The iron group metal to silicon to oxygen atomic ratio in the final product is from about 1:2:5.5 to about 1:12:25.5, and the atomic ratio of the iron group metal to copper is from 0.05:1 to 1.5:1.

The use of catalysts comprising silicon, oxygen and an iron group metal chemically combined to form an inorganic polymer structure are known in the art as catalysts for the sweetening of hydrocarbons. (See, for example, U.S. Pat. 3,491,020 to Norman L. Carr et al.) The use of copper chloride as a hydrocarbon sweetening catalyst has been known for a much longer period of time. The teachings of Carr et al. suggest the use of various promoting agents including selenium or one of the alkali metals. Absent from the teachings of Carr et al. is any suggestion or teaching that a copper salt can be used as a promoting agent for an inorganic polymer consisting of iron, oxygen and silicon. This may be so since copper salts are not known as promoting agents but rather are sweetening catalysts in their own right. It was therefore surprising to find the addition of copper salt to the preparation of the iron-silicon-oxygen catalysts in the manner set forth above would result in the catalyst having unusually long life for the sweetening of hydrocarbons. In addition, it is known that copper salts in the presence of ammonia will form copper amines which are highly soluble in water. It was thus not expected that the copper salts could be precipitated together with the iron and silicon in a single step. Surprisingly, not only did the copper salts precipitate together with the iron and the silicon in a single step, but the copper precipitated substantially quantitatively. Further, the method of this invention provides a simple one-step method for the production of a copper-iron-silicon catalyst.

The catalytic composite described with reference to iron as the iron group metal and without copper is a chemical combination comprising iron, oxygen and silicon in an amorphous inorganic high molecular weight polymer-like material containing multiple and random Si-O-Si, Si-O-Fe, and Fe-O-Fe linkages, with each silicon atom directly united to four oxygen atoms and each iron atom directly united to three oxygen atoms. When the copper salt is added by the method of this invention, it is believed that a substantial portion of the copper forms the spinel $CuFe_2O_4$.

Thus the catalyst of this invention is a co-gelled composite comprising an iron group metal, silicon, oxygen and copper which are believed to be chemically associated together as an inorganic, amorphous copolymer and/or at least in part as $CuFe_2O_4$.

The catalyst of this invention is prepared as follows: A dilute silica sol is mixed with an aqueous solution of a compound capable of yielding iron group metal ions in solution, such as ferric chloride, and a compound capable of yielding copper ions in solution, such as cupric chloride. Cogelation of the resulting mixture is accomplished preferably by raising the pH with a base containing ammonia.

By the term "silica sol" in this specification is meant a silica hydrosol selected from sodium silicate solutions, potassium silicate solutions, and those silica sols which are free or substantialy free of cationic impurities. By "cationic impurities" are meant metallic cations, especially the alkali metals, as, for example, sodium, and the alkaline earth metals, as exemplified by calcium. The commercially available sodium silicate solution and potassium silicate solution, sometimes called "water glass" are particularly satisfactory and are recommended. These solutions usually contain about 30 percent by weight $SiO_2$. "Water glass" is prepared by fusing silica with sodium carbonate or potassium carbonate, and the product is a colloidal suspension of silica in sodium or potassium silicate.

A number of methods are available for the preparation of a cation-free, dilute silica sol. Preferably, a dilute aqueous solution of a sodium silicate, such as water glass, is flowed, as by percolation or pumping, through a bed of protonated cation-exchange material to recover an effluent dilute silica sol substantially free of cationic impurities. Any soluble silicate can be used in this method, but the sodium silicate solutions commonly known in the art as "water glass" are preferred since they are inexpensive and readily available.

The silicate solution used in preparing the cation-free silica sol is dilute, preferably containing no more than the equivalent of about five weight percent silica and preferably between one and three percent silica. Solutions more or less concentrated can be employed satisfactorily, the upper and lower limits being that concentration which will pass through the ion-exchange column without gelling and that volume of liquid which can be conveniently handled, respectively.

Any solid cation-exchange material insoluble in water can be used to prepare the protonated silica sol. Cation-exchange resins of high cation-exchange capacity such as sulfonated phenol formaldehyde resins or divinylbenzene crosslinked sulfonated polystyrene resins, like Amberlite IR-120 (manufactured by Rohm and Haas), have given excellent results in the production of dilute silica sols. In every instance the ion-exchange material must be in acid form. It can be placed in this form by washing with a suitable strong acid such as sulfuric acid or hydrochloric acid. Any residual free acid can be washed from the ion-exchange material with water.

In producing the cation-free silica sol, a single bed of cation-exchange material can be employed, or a plurality of beds arranged in series or in parallel, or both, can be used. When beds are employed in series, it is advantageous to feed the fresh silicate solution to the most nearly spent bed of cation-exchange material with a substantially cation-free silica sol emanating from the most recently regenerated bed of ion-exchange material. Regeneration is accomplished by acid washing, as described above for the initial preparation of the ion-exchange material. To determine when a bed is spent, it is convenient to measure continuously or from time to time the pH or the conductivity of the effluent silica sol. The pH of a satisfactory sol is in the neighborhood of three and its specific conductance is in the neighborhood of $10^{-4}$ to $10^{-5}$ ohm$^{-1}$ cm.$^{-1}$. When the pH rises to about five, the processing is preferably interrupted for regeneration of the beds.

The pH of the silica sol is desirably maintained at a level less than five to prevent premature gelation of the sol. As indicated below, dilute, cation-free silica sols are unstable, tending to gel, which tendency, is greatly accelerated when the pH is raised. Further, a rise in pH of the effluent silica sol indicates that the ion-exchange bed is no longer functioning efficiently in exchanging protons for cationic impurities. Maintaining the pH at less than five tends to maximize the stability of the silica sol while minimizing the concentration of cationic impurities.

Silica sols, substantially free of cationic impurities as prepared by other methods can also be employed within the scope of this invention. For example, satisfactory dilute cation-free silica sol can be made by hydrolysis of ethylorthosilicate or of silicon tetrachloride.

"Water glass" is prepared by fusing silica with sodium carbonate, the product is a colloidal suspension of silica in sodium silicate. When this suspension of silica in sodium silicate is treated by passage through a protonated ion-exchange column, the resulting product is an aqueous colloidal suspension of silica and silicic acid having a pH of about three. This silica sol, wherein the colloidal particles of silica and silicic acid are very finely dispersed, is the starting material for this invention. The silica sol in this form is relatively stable in that it does not gel immediately, but on standing, changes akin to polymerization do occur. The colloidal particles become larger and the molecular weight of the silicic acid increases as the chain length grows. This process continues until the material has gelled. It is believed that polymerization is a function of pH, the nature of the impurities, the mobility of the impurities and the mobility of the particles. It has also been found that thermal aging of the silica sol, for example at temperatures from about 150° F. to 250° F., preferably 180° F. to 200° F., for at least four hours, usually 4 to 24 hours, prior to reaction of the silica sol with iron ions yields a final catalyst having large pores, i.e. a higher average pore radius.

According to the method of this invention, the alkali metal containing or alkali metal-free silica sol is admixed with the aqueous solution of the compound that yields the desired Group VIII iron group metal ion in solution and the compound that yields the desired copper metal ion in solution. It is preferred that the thermally aged alkali metal-free silica sol be used as freshly prepared as possible. The characteristics of the final composite include a high surface area, as high as 350 m.$^2$/g. or higher. X-ray spectographic analysis of a silica sol, ferric chloride, copper chloride solution cogelled with ammonia, dried and calcined at 400° F. to 800° F. showed an amorphous polymer structure with no indication of a crystalline phase such as copper chloride.

For the practice of this invention, the salt of the Group VIII iron group metal employed must be soluble in the solvent used, for example, water, an alcohol such as ethyl alcohol, or other high dielectric constant materials such as dioxane, etc., in order that the iron group metal and silicon can form a cogel when the base is added. Examples of the salts of iron group metals which may be successfully employed in this invention are the nitrates; sulfates; halides; acetates; nitrites; and suitable organometallic compounds of cobalt, nickel and iron.

A list of suitable salts includes, but is not limited to: $FeCl_3$; $Fe(NO_3)_3$; $Fe(NO_3)_2$; $FeCl_2$; $Fe(NO_2)_2$; $FeBr_3$; $Fe(C_2H_3O_2)_3$; $Fe_2(C_2O_4)_3 \cdot 6H_2O$; $FeOCl$;

$$Fe(ClO_4)_3 \cdot 6H_2O$$

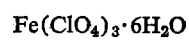

$NiCl_2$; $NiF_2$; $Ni(NO_3)_2$; $CoCl_2$; $Ni(C_2H_3O_2)_2$; $Fe(SO_4)_3$; $CoF$; and $Co(NO_3)_2$.

The most preferred iron group metal salt for use in the practice of the instant invention is ferric chloride. Ferric chloride is readily soluble in water, is inexpensive, is readily available in quantity, easily forms an insoluble gelatinous precipitate in the presence of basic substances such as ammonia, thereby readily permitting the desired cogelation, and yields a finished catalytic product of outstanding properties. Although a preferred mode of operation is to use the iron group metals in their higher oxidation states, it is within the contemplation of this invention to employ a soluble salt of an iron group metal in its lower oxidation state, form the cogel and then oxidize the metal ion to its higher oxidation state.

Similarly, the copper salt employed must be soluble in the solvent used, for example, water, an alcohol such as ethyl alcohol, or other high dielectric constant materials such as dioxane. Examples of copper salts which may be successfully employed in this invention are the halides, nitrate, sulfate and acetate, i.e. copper chloride; copper nitrate; copper sulfate; copper acetate; copper bromide; copper iodide and copper fluoride. Copper chloride ($CuCl_2$) is the most preferred copper salt.

When the silica sol, iron group metal solution and copper salt solution are admixed, mixing should be sufficiently thorough to produce a homogeneous liquid. The cation-free dilute silica sols are unstable, however, and have a tendency to gel, and it is therefore essential for superior results that the silica sol, substantially cation free, be used soon after its preparation, i.e. within 24 hours and preferably within one hour after its preparation, said preparation including thermal aging as set forth above. The preferred practice when a substantially cation-free silica sol is employed is to admix the thermally aged silica sol to an aqueous solution of the iron group metal cations and the copper cations. The potassium silicate and sodium silicate hydrosols can be used as purchased or may be diluted. The solution of iron group metal cations and copper cations will generally contain the cations of only one of the three iron group metals; however, the solution can contain a mixture of the cations of any two or all three of the iron group metals, i.e. iron, cobalt and nickel.

Once the mixture has been thoroughly homogenized, co-gelation is brought about by increasing the pH of the solution by the addition of a base such as ammonium hydroxide. This may be done conveniently by the addition of aqueous ammonium hydroxide with stirring or by the addition of gaseous ammonia, as through a sparger. Ammonia has the advantage that it is inexpensive, easily available and leaves no residue upon calcination of the resulting cogel. Other bases such as trimethyl ammonium hydroxide may also be employed, but they are expensive and are considered to have no particular advantage. When salts of nickel and cobalt and such metals are used as a source of iron group metal cations, ammonia per se cannot be used to adjust the pH, since these metals form complex amines in admixture with ammonia. A convenient means of adjusting the pH when salts of metals such as nickel or cobalt are used, is to add ammonium bicarbonate.

On addition of the base to the copper-iron group metal cation-silica sol solution, a slurry is formed consisting of a gelatinous precipitate and water. Although this gelatinous precipitate can be removed at will, it is preferred to allow it to stand about 16 hours to assure complete precipitation. The precipitate can be separated from the supernatant liquid in any convenient manner, as for example, by filtration. The precipitate is then washed with water containing low levels of $NH_3$ to remove any contaminants. This washing process advantageously can be continued until conductivity measurements reach a constant level.

The copper containing gelatinous precipitate can then be dried, for example, in a forced draft oven, at a temperature in the range of from 200° F. to 300° F. over a period of from 10 to 30 hours. The dried product can then, if desired, be calcined in air at a temperature from 400° F. to 800° F. over a period of from 10 to 20 hours, preferably at from about 500° F. to 700° F. for about 16 hours, to form the catalyst of the instant invention.

Not all concentrations of the iron group metals applicable to the practice of the instant invention can be employed under the process conditions herein set forth. It is believed that at metal concentrations in excess of about 60 percent by weight, the catalyst would demonstrate crystalline characteristics and display an atendant loss of desirable properties. The iron group metal and silica sol are preferably used in proportions to make the catalytic composite with an atomic ratio of iron group metal to silicon to oxygen within the range of about 1:2:5.5 to about 1:12:25.5. The most preferred catalytic composite contains an iron group metal to silicon to oxygen atomic ratio of about 1:4:9.5. In the oxidized catalytic composite there is sufficient oxygen to fully satisfy the valence requirements of both the iron group metal and the silicon. This invention contemplates the utilization of either one, two or all three iron group metals in the catalyst composite, preferably with a total iron group metal content within the specified proportions.

The amount of copper to employ should be such that the atomic ratio of copper to the iron group metal is from 0.05:1 to 1.5:1, preferably from 0.1:1 to 1:1. Using these atomic ratios of copper to iron group metal and the above stated ratios of iron to silicon, the final catalyst has from 2 to 50 weight percent copper, preferably from 5 to 35 weight percent copper.

The composite has utility as a low temperature oxidation catalyst and an adsorbent for sulfur-containing compounds. In one embodiment, the composite can be used in an improved method for sweetening sour hydrocarbons. More particularly the catalytic composite can be used for selectively oxidizing mercaptan sulfur, which is contained in a hydrocarbon, to form disulfide sulfur at a low temperature.

It has been found that if a petroleum distillate containing mercaptans is subjected, at a suitable temperature, to contact with air or another source of oxygen in the presence of the cogelled catalytic copper containing composite of the process of the instant invention, such mercaptans are converted to alkyl disulfides or other noncorrosive compounds having no offensive odor and the distillate is thus "doctor" negative.

The charge stock which can be sweetened using the catalyst of this invention can be any atmospheric petroleum distillate having a boiling point from about 50° F. to 700° F. This boiling range encompasses petroleum fractions such as liquid petroleum gas to heavy distillate fuel oils. Usually sweetening processes are relegated to the higher boiling charge stocks such as liquid petroleum gas, gasolines and naphthas. It is one of the advantages of the catalysts of this invention that they are useful for the sweetening of higher boiling petroleum distillates such as kerosene and heavy distillate fuel oils.

The contact treatment with the catalytic composite described above can be carried out at a temperaure as low as 0° F. to 300° F. The preferred temperatures are in the range of from 80° F to 200° F. The process can be carried out at a pressure ranging from atmospheric to 500 p.s.i.g. The preferred range of pressure is from 25 to 100 p.s.i.g.

When added free oxygen in the form of air or other suitable source is used, it is advantageous to bring the oxygen and the distillate into intimate contact with each other prior to contact with the catalyst. The purpose of this oxygen addition is to replenish the structural oxygen removed from within the catalyst during the oxidation reaction. The catalytic composite contains sufficient chemisorbed or matrix oxygen within its structure which is available for sweetening to permit at least one complete cycle of a practical size without the addition of any oxygen whatever to the feed stock. However, the addition of process oxygen tends to extend the practical working cycle time of the catalyst and reduces the frequency of reactivation. The oxygen concentration of the feed stock may range then, from no oxygen in the feed stock, to that naturally present, to that oxygen concentration resulting from complete saturation of the feed stock with air, or indeed in some cases the amount of air may exceed the saturation limit of the oil. Although one mode of operation, saturating the feed stock with air, is not critical within the contemplation of this invention, this air saturation eliminates any need for such control or metering apparatus as would be necessary if the air or oxygen concentration were critical when supplemental oxygen is used. It is also desirable and necessary for repeated use to subject the composite catalyst to a suitable regeneration treatment for reactivation when it becomes spent.

The catalyst does lose its activity in use, possibly as a result of a reduction in lattice oxygen within the catalyst or gum formation. It is not affected by by-product water. For this reason it is adavntageous to employ multiple reactors which are alternately on stream. This permits the reactivation of one catalyst bed while the other or others continue to function. It has been found that the highest catalytic activity is achieved by a short-time activation with air at atmospheric pressure. For example, activation of fresh catalysts results from passing air at atmospheric pressure through the catalyst bed at a temperature of about 500° F. for about 40 minutes. The main purpose of reactivation is to remove gum and to replenish the oxygen in the lattice structure of the catalyst.

In a general embodiment of this invention, the sour hydrocarbon feed with or without added contact with air is heated. Usually the distillate or the mixture of distillate and air may be preheated to the reaction temperature or the mixture may be heated in the reaction vessel. Alternatively, the distillate may be optionally preheated and passed down flow through the reactor while air or other gas containing free molecular oxygen is passed concurrently with or countercurrently to the distillate charge stock. If the latter procedure is employed, care should be taken not to use excessive amounts of air since this will promote gum formation and thus tend to shorten the cycle life. Preferably the amount of oxygen is 1.5 times that stoichiometrically required to react with the thiols, but amounts from 0.5 to 20 times the stoichiometric quantity have been used.

The distillate and air are passed into the reaction vessel containing the copper catalyst under appropriate conditions of temperature and pressure. The space velocity of the sour distillate is in general dependent upon the properties desired for the final product, the thiol content of the charge stock and the particular temperature chosen. A suitable space velocity is in the range of one to 50 liquid volume hourly space velocity based on the total flow, but the space velocity is usually in the range of from 1 to 10 LVHSV.

The sweetened product together with any excess air is passed from the catalyst bed into a suitable condenser which is maintained at a temperature sufficiently low to condense any distillate vapors. The air is separated from the distillate and a noncorrosive and "doctor sweet" product is recovered. The invention will be further described with reference to the following experimental work.

EXAMPLE 1

The catalyst for this example was prepared as follows:

(1) 261 grams of sodium silicate solution (28.7% $SiO_2$) were admixed with 3 liters of distilled water and passed through a bed of 300 grams of a protonated ion-exchange resin to produce an alkali metal-free silica sol (pH 3 to 3.5).
(2) The resin was washed with 1.5 liters of distilled $H_2O$ and the washings were added to the alkali metal-free silica sol.
(3) The silica sol was thermally aged at 180° F. for four hours, then held at room temperature for 16 hours.
(4) Dissolved 84.2 grams $FeCl_3 \cdot 6H_2O$ and 28.0 grams of $CuCl_2 \cdot 2H_2O$ in 600 ml. distilled water. This solution was combined with the silica sol soltuion (pH=2).
(5) To the resulting mixture was added with constant mixing, in a flow stream, dilute aqueous ammonia (about 9% $NH_3$) in an amount sufficient to raise the pH of the resulting mixture to 8.
(6) The slurry was let stand overnight and then filtered, and the filter cake was washed with water containing 0.0003% $NH_3$. Washing of the filter cake was stopped when conductivity measurements fell to a constant level; and
(7) The filter cake was oven dried at 250° F. for 16 hours and then calcined at 600° F. for 16 hours.
(8) The catalyst prepared by this method was non-crystalline and contained 8.4% Cu, 20.6% $Fe_2O_3$, 0.11% Cl and 58% silica, the balance being primarily oxygen. The surface area was 430 m.²/g. by B.E.T. method.

EXAMPLE 2

The catalyst from Example 1 above was used to sweeten a heavy distillate fuel oil whose properties are given on Table I below.

Table I.—Heavy distillate fuel oil inspections

| Inspection: | Heavy distillate fuel oil |
|---|---|
| Gravity: ° API | 40.4 |
| Viscosity, SUV, 100° F. | 37.3 |
| Flash, P–M: ° F. | 194 |
| Pour point, ° F. | +15 |
| Color, ASTM D1500 | 0.5 |
| Total sulfur, weight percent | 0.12 |
| Mercaptan Sulfur: p.p.m. | 394 |
| Total acid number, ASTM D–974 | 0.01 |
| Aniline point, ° F. | 175 |
| Distillation, ASTM D–86, ° F.: | |
| Overpoint | 428 |
| Endpoint | 626 |
| 10% at | 500 |
| 50% at | 550 |
| 90% at | 592 |

The sweetening reaction occurred by passing the heavy distillate together with 65 s.c.f. of air per bbl. upflow at 150° F., 50 p.s.i.g. and a 126 liquid weight hourly space velocity through a bed of the catalyst. The sweetening activity was determined by testing the product oil at four-hour intervals using the doctor test (ASTM Test D–484) that is sensitive for detecting thiol sulfur concentrations of greater than about 3 p.p.m. on the product.

EXAMPLE 3

The catalyst for this example was prepared as follows:

(1) 900 grams of $K_2SiO_3$ sol (approximately 30% $SiO_2$) were dissolved in 8.8 liters of distilled water.
(2) Dissolved 197.7 grams $FeCl_3 \cdot 6H_2O$ and 65.8 grams $CuCl_2 \cdot 2H_2O$ in 1370 ml. of distilled water.
(3) Combined slowly and with stirring solutions from Steps 1 and 2. (pH=5.2)
(4) To the resulting mixture was added with constant mixing, in a flow-stream, dilute aqueous ammonia (about 9% $NH_3$) in an amount sufficient to raise the pH of the resulting mixture to 7.2.
(5) The slurry was allowed to stand overnight and then filtered. The filter cake was washed with water containing 0.0003% $NH_3$. Washing of the filter cake was stopped when conductivity measurements fell to a constant level.
(6) The filter cake was oven dried at 250° F. for 16 hours and then calcined at 600° F. for 16 hours.
(7) The final catalyst contained 6.7% Cu, 20.6% $Fe_2O_3$, 1% $Cl_2$ and 60% $SiO_2$. The balance is mainly oxygen. The surface area was 391 m.²/g. by the B.E.T. method.

EXAMPLE 4

The catalyst of Example 3 was used in a sweetening process as in Example 2 above and the throughput of sweet product increased to about 90.

Resort may be had to such variations and modifications as fall within the spirit of the invention and the scope of the appended claims.

We claim:
1. A process for the oxidative sweetening of sour hydrocarbons which comprises contacting a sour hydrocarbon under sweetening conditions with a calcined cogelled catalytic composite comprising iron, silicon, oxygen and copper, said composite resulting from the steps of:
forming a solution of a silica sol, an iron salt and a copper salt;
cogelling said solution to form a cogelled precipitate;
drying said cogelled precipitate; and
calcining said dried precipitate;
the amount of said silica sol, said iron salt and said copper salt being such that the iron salt to silicon to oxygen atomic ratio in the final product is from about 1:2:5.5 to about 1:12:25.5, and the atomic ratio of the copper to iron salt is from 0.05:1 to 1.5:1.

2. A process according to claim 1 wherein the silica sol is a substantially alkali metal-free silica sol.

3. A process according to claim 1 wherein the silica sol is a potassium silicate hydrosol.

4. A process according to claim 1 wherein the sour hydrocarbon is contacted with said composite and in the presence of a gas containing free molecular oxygen.

5. A process according to claim 4 wherein the proportion of iron salt to silica sol is selected to result in a calcined cogelled product having an iron to silicon to oxygen atomic ratio of about 1:4:9.5; an atomic ratio of copper to iron from 0.1:1 to 1:1; and wherein the amount of iron is from about 10 to about 60 weight percent of said composite.

6. A process according to claim 3 wherein the sweetening conditions comprise a temperature from about 0° to about 300° F., and a pressure from about 0 to about 500 p.s.i.g.

7. A process according to claim 4 wherein said sour hydrocarbon is a distillate boiling from 50° F. to 700° F.

References Cited

UNITED STATES PATENTS

| | | | |
|---|---|---|---|
| 2,418,884 | 4/1947 | Hoover | 208—191 |
| 2,750,261 | 6/1956 | Ipatieff et al. | 252—474 |
| 3,491,020 | 1/1970 | Carr et al. | 208—189 |
| 3,555,106 | 1/1971 | Ohmori | 252—474 |
| 3,617,518 | 11/1971 | Sinfelt et al. | 252—474 |

DELBERT E. GANTZ, Primary Examiner

G. J. CRASANAKIS, Assistant Examiner

PO-1050
(5/69)

UNITED STATES PATENT OFFICE
CERTIFICATE OF CORRECTION

Patent No. 3,746,637          Dated    July 17, 1973

Inventor(s)  Sun W. Chun, Harry A. Hamilton and Angelo A. Montag

It is certified that error appears in the above-identified patent and that said Letters Patent are hereby corrected as shown below:

Col. 6, line 27 - "higher" should be --lighter--;

Col. 7, line 68 - "Cl" should be --$Cl_2$--.

Signed and sealed this 27th day of November 1973.

(SEAL)
Attest:

EDWARD M. FLETCHER, JR.           RENE D. TEGTMEYER
Attesting Officer                 Acting Commissioner of Patents